United States Patent [19]

Breuckmann et al.

[11] Patent Number: 4,627,729

[45] Date of Patent: Dec. 9, 1986

[54] DIFFERENTIAL HOLOGRAPHIC METHOD

[75] Inventors: Bernd Breuckmann, Neubiberg; Werner Thieme, Munich, both of Fed. Rep. of Germany

[73] Assignee: M.A.N. Maschinenfabrik Augsburg-Nurnberg Aktiengesellschaft, Postfach, Fed. Rep. of Germany

[21] Appl. No.: 577,082

[22] Filed: Feb. 6, 1984

[30] Foreign Application Priority Data

Feb. 5, 1983 [DE] Fed. Rep. of Germany ....... 3303876

[51] Int. Cl.[4] ............................................. G01B 9/025
[52] U.S. Cl. .................................................. 356/347
[58] Field of Search ...................... 350/3.6, 3.66, 3.67, 350/3.68, 3.69, 3.75, 3.77, 3.73; 356/347; 73/656

[56] References Cited

U.S. PATENT DOCUMENTS

| 3,563,652 | 2/1971 | Powell et al. | 350/3.6 |
| 3,627,426 | 12/1971 | Tsuruta et al. | 350/3.6 |
| 3,644,047 | 2/1972 | Brown et al. | 350/3.67 |
| 4,464,052 | 8/1984 | Neumann | 356/347 |

Primary Examiner—Bruce Y. Arnold
Attorney, Agent, or Firm—Scully, Scott, Murphy & Presser

[57] ABSTRACT

A differential holographic method and arrangement for measuring and testing the changing conditions of objects or articles, in which there are taken intermediate holograms of an unflawed reference object, and from which there are employed the reconstructed object waves of the reference object in order to illuminate the test object for a holographic exposure. Two reference beams record two intermediate holograms of the reference object on one holographic plate, and successively illuminate the test object with the reconstructed object wave fields from the intermediate holograms with utilization of the associated conjugated reference beams.

2 Claims, 3 Drawing Figures

DIFFERENTIAL HOLOGRAPHIC METHOD

BACKGROUND OF THE INVENTION

1. Field of the Invention

The present invention relates to a differential holographic method for measuring and testing the changing conditions of objects or articles, in which there are taken intermediate holograms of an unflawed reference object, and from which there are employed the reconstructed object waves of the reference object in order to illuminate the test object for a holographic exposure.

2. Discussion of the Prior Art

The conventional holographic method for measuring the changes in an object, such as they occur in, for instance, acoustics, in vibration analyses and deformation measurement techniques, consists of recording several holograms of various objects or object conditions on a photographic plate. During the reconstruction of the object, the superimposition of the various, as a rule of two object images, produces an interference image in which the interference bands facilitate a qualitative and quantitative indication of changes in the object.

The application of this method to nondestructive testing is predicated on the fact that flaws in an object, or deviations of a test object from a reference object will lead to changes in the interference pattern. However, inasmuch as only such flaws can be recognized through which the interference pattern is visibly disrupted relative to the unflawed condition, in many instances easily discernible evidence is not afforded by the described graphic method.

An improvement over the above-described testing method can be achieved with a so called differential holographic method, in which there is not represented the entire interference pattern resulting from the two object states, but only the deviations of the test object from a reference object.

In this known differential method, the holograms of a reference object in its original and in its deformed state are initially produced on two separate holographic plates. These holograms, herein referred to as intermediate holograms, are then successively illuminated employing the conjugated reference beam. The reconstructed object waves produced therefrom are then used in a second step for illuminating the respective object conditions of the object under test. The reconstructed image of the holograms obtained in this manner on a second holographic plate illustrates a test object pattern which is free from interference bands in the unchanged or equally shaped areas of the reference and test objects, and shows interference line fields which indicate the deviations in form or the deformation of the test object in contrast with that of the reference object.

This reduced data reproduction facilitates a significantly improved resolution and, consequently, also the measurability of minimal changes. This method has the disadvantage, however, that subsequent to developing of the two holographic plates on which the intermediate holograms have been recorded, their repositioning must be exact in order to avoid phase deviations in the reconstructed object wave fields. Considerable difficulties will also be caused by the fact that, in general, the optical thicknesses of the two holographic plates will not completely match after developing, which can again produce uncontrollable phase deviations in the reconstructed object wave fields.

SUMMARY OF THE INVENTION

Accordingly, it is a primary object of the present invention to so improve upon the known differential method, that the quality of the measurements are made more accurate, with a reduction of errors, particularly through the positioning.

It is a more specific object of the present invention to employ two references beams to record two intermediate holograms of the reference object on one single holographic plate, and to successively illuminate the test object with the reconstructed object wave fields from the intermediate holograms with utilization of the associated conjugated reference beams.

In this manner, as in the known differential method, it is possible to completely eliminate the unnecessary information with regard to the behavior of the unflawed reference object, and to only represent an area of the flaw in the test object in comparison with the reference object, however, with the advantage in that only one intermediate holographic plate is used which ensures that the two intermediate holograms after being developed will precisely conform for the illumination of the test object. This reduces the source of error in comparison with the known method in an extremely important aspect.

Any potential sources of error still remaining in the inventive method such as possibly the repositioning of the intermediate holographic plate, and the object articles can be more easily controlled through mechanical restricting and similar means than bringing into coincidence the wavefronts of different holographic plates, as is required in the known differential method. In particular, the concurrent reconstruction of both object waves, occasioned by the illumination of the intermediate holographic plate with both conjugated reference beams, permits the direct verification and adjustment of the measuring set-up on the basis of the interference pattern produced thereby.

The inventive method is adapted for the comparative measurement of the deformation of a test article in comparison with a reference object, as well as for the comparison of article dimensions between a test specimen and a reference object. In the former case of deformation the holographic measurement is carried out by using two laser beams as reference waves of equal wavelengths, whereas in the second case of dimensions, the reference or test object is presently illuminated twice in its unchanged state with laser beams of different wave lengths.

The present invention also encompasses an apparatus for implementing the method, and which consists of an object carrier, an object illuminating source, a first holographic plate holder, a second holographic plate holder arranged in the reflected object wave path, as well as a reference beam source associated with the holographic plate for the first holder and two further reference beam sources associated with the holographic plates for the second holder.

In order to be able to employ the apparatus for both types of comparative measurements, it is advantageous when the laser light of at least one reference beam source for the intermediate hologram is variable with respect to its wave length.

BRIEF DESCRIPTION OF THE DRAWINGS

Reference may now be had to the following detailed description of the invention, taken in conjunction with the accompanying drawings; in which.

DETAILED DESCRIPTION

Figure 1:
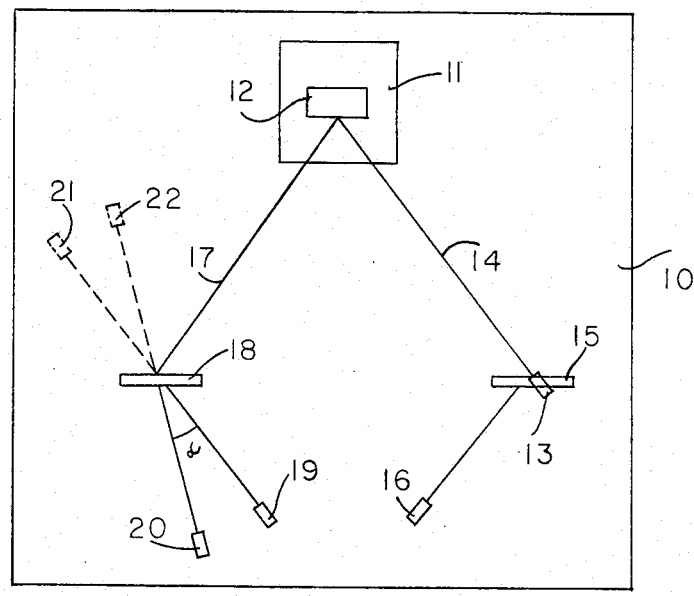
FIG. 1 is a schematic plan view of a measuring arrangement for holographic recording pursuant to the inventive method.

Illustrated in FIG. 1 is a plan view showing the general arrangement of a set-up for holographic recordings utilizing the inventive method. Arranged on the top of a table 10 are an object holder 11 for an article 12 which is to be measured, an object radiation source 13 projecting a beam 14 towards the article 12. Moreover, there is provided a first holder 15 for a holographic plate which is associated with a reference beam source 16.

Positioned in the wave path 17 which is reflected from the object 12 is a second holographic plate holder 18, which is associated with two reference beam sources 19, 20 which are offset by an angle α. When required, a conjugated beam source 21 or 22, shown in phantom lines, can be associated with, respectively, each reference beam source 19 and 20.

The inventive holographic method is described more fully hereinbelow on the basis of the exemplary embodiment illustrated in FIG. 1 and referring to FIGS. 2 and 3.

Figure 2:
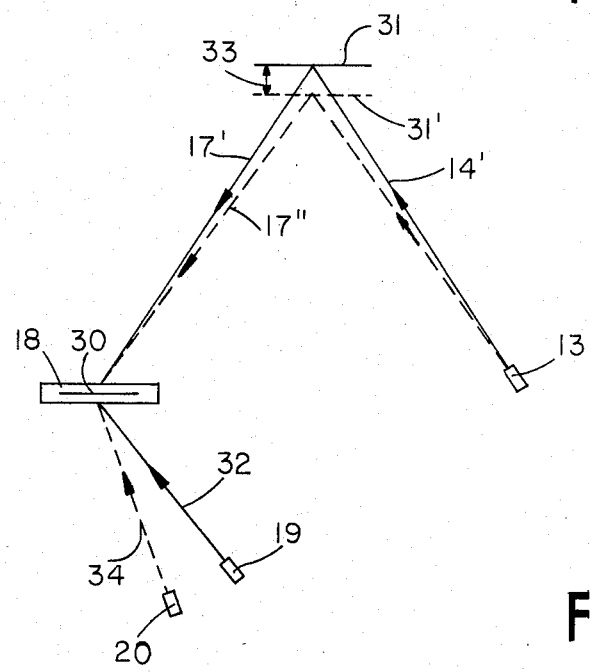
FIG. 2 illustrates the apparatus during the first phase of implementing the method.

FIG. 2 of the drawings illustrates the arrangement for the first phase of the method, which relates to the recording on a holographic plate 30 of two intermediate holograms of a reference object one prior to and one subsequent to deformation. The reference object, the illuminated surface area of which is shown for purposes of clarity by means of a straight line 31, is illuminated by object radiation beam 14'. The wave field 17' which is reflected from the surface area 31 is recorded, together with the superimposed reference wave 32 from the reference beam source 19, on the holographic plate 30. Recorded on the same holographic plate 30 is the reference object in its deformed state 31', employing the second reference beam 34, wherein the waves taking part in the process are illustrated by phantom lines. The reflected object wave 17", due to the deformation 33, is subjected to a corresponding phase shift in comparison with the original wave field 17'. The holographic plate 30, which has been double-exposed in this manner, is then removed from the holder 18 and developed.

Figure 3:
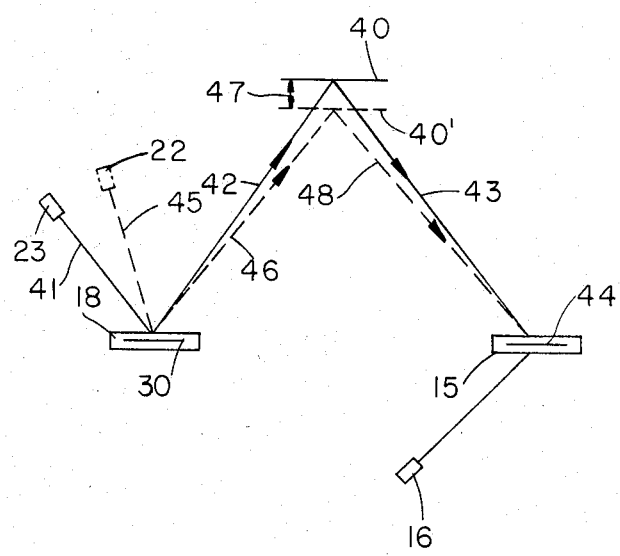
FIG. 3 is a view similar to FIG. 2 during the second phase.

The developed intermediate hologram 30 is then replaced in the holder 18 for the second phase of the method, as shown in FIG. 3. By means of suitable devices provided in the holder 18, the holographic plate 30 can be replaced in precisely the position it had assumed during the first phase of the method. The object in this case is the test article or specimen, the illuminated surface area of which in the undeformed state thereof is identified by the reference numeral 40. The object illumination, in this instance, is the wave field 42 reconstructed with the aid of the conjugated wave 41 of the reference beam 32.

The reflected object wave 43 is recorded on a second holographic plate 44. In a similar manner, the deformed state 40' of the test specimen is illuminated (46) employing the conjugated beam 45 of the second reference wave 34 and is recorded on the holographic plate 44 utilizing the same reference beam source 16.

When the deformation 47 of the test object corresponds with the deformation 33 of the reference object, then the phase displacement of the waves 42 and 46, which corresponds to that of the waves 17' and 17" of the first phase, and thereby with the deformation 33 of the reference object, is again cancelled by reversal of the optical path lengths during the second phase of the method, so that the reflected object waves 43 and 48 are in phase to thereby produce either a bright or a dark field on the hologram. Interference bands will, accordingly, be produced only in those areas of the comparison objects in which the deformation 47 of the test specimen deviates from the deformation 33 of the reference object. In this manner, any unnecessary information relative to the deformation behavior of the unflawed reference object is completely eliminated and only the flaw in the test object is shown as a surface representation. The flaw, therefore, is readily identified as to location, type and size for a rapid quality decision.

The method as described herein also allows for control capabilities and thus optimizing the accuracy of the obtained measurements. Furthermore, only a single intermediate plate 30 need be adjusted whereby any interference or inaccurate positioning will affect in the same manner both wave fronts 42 and 46. Considering that only the differences in the wave fronts 43 and 48 are recorded, the interference pattern will not be falsified or even completely eliminated such as upon the occurrence of extensive disturbances.

Even a recopying of the intermediate hologram to plates with a higher diffraction degree can be undertaken without adversely affecting the method or quality or measurement.

The described inventive differential holographic method is also suitable for effecting dimensional inspections of test specimens through comparison with a reference object. In that instance, illumination with the object illumination source 13 from the reference object is effected twice in succession during the first phase, and the two intermediate holograms are produced with the reflected object waves 17 and the reference waves from the sources 19 and 20, using laser light with different wave lengths. During the second phase, object illumination is similarly carried out with the aid of conjugated wave fronts of equal wavelength difference. Also in this instance there is produced an interference pattern for merely the areas of the test specimen whose size deviates from that of the reference object.

In summary, the present invention concerns a two phase method for measuring the changing conditions of objects with the aid of holograms, while using a reference object. In the general practice of the present invention, a reference object and a test object to be measured are generally equal. The behavior or response of the reference object to a changed condition of some kind, for instance deformation thereof, is known while that of the test object is to be measured. In a first phase, a first hologram is taken of the unchanged reference object placed on an object holder, and then a condition of the reference object is changed. In a second phase, a similar procedure is repeated with the test object to be measured placed on the object holder.

In greater particularity, in the first phase, two intermediate holograms of a reference object are taken on a single intermediate plate 30. This is accomplished by placing the intermediate plate 30 in the second plate holder 18, illuminating the reference object with the radiation source 13 (beam 14), and using two differently placed reference beam sources 19 and 20, one for each of the two holograms, to obtain two different holograms on the same plate.

In the second phase, two exposures are made on a second plate 44 of the test object to be measured. This is accomplished by placing the test object in the same position on the object holder that the reference object was placed previously, placing the second plate 44 in the first holder 15, using a third reference beam source 16, and successively illuminating the unchanged and changed test object with the reconstructed object wave fields from the intermediate holograms. On the second plate interference lines will appear for only those parts in which the test object to be measured differs from the reference object.

What is claimed is:

1. An improvement in a differential holographic method for measuring and verifying the changing condition of objects by holographic exposure in a method in which a first intermediate hologram of a reference object in an unchanged state is recorded, a second intermediate hologram of the reference object in a changed state is recorded, a test object, having a surface contour similar to that of the reference object, in an unchanged state is illuminated with the reconstructed object wave field from the first intermediate hologram, and the test object in a changed state is illuminated with the reconstructed object wave field from the second intermediate hologram, the improvement comprising: producing the first and second intermediate holograms of the reference object positioned in a holder while using successive reference beams incident on a single holographic plate, removing the reference object from the holder and replacing it with the test object, and successively illuminating the test object with the reconstructed object wave field from the first and second intermediate holograms on the single holographic plate by employing associated conjugated first and second reference beams on the single holographic plate, and recording the holograms resulting from the interference between the light reflected by the successive illumination of the test object with a third reference beam on a second holographic plate for subsequent interpretation.

2. An improvement in a differential holographic method for measuring and verifying dimensional differences of objects by holographic exposure in a method in which a first intermediate hologram of a reference object using a first reference beam at a first wavelength is recorded, a second intermediate hologram of the reference object using a second reference beam at a second wavelength is recorded, a test object, having a surface contour similar to that of the reference object, is illuminated with the reconstructed object wave field from the first intermediate hologram, and the test object is illuminated with the reconstructed object wave field from the second intermediate hologram, the improvement comprising: producing the first and second intermediate holograms of the reference object positioned in a holder while using first and second successive reference beams at first and second different wavelengths incident on a single holographic plate, removing the reference object from the holder and replacing it with the test object, and successively illuminating the test object with the reconstructed object wave field from the first and second intermediate holograms on the single holographic plate by employing associated conjugated first and second reference beams at first and second different wavelengths incident on the single holographic plate, and recording the holograms resulting from the interference between the light reflected by the successive illumination of the test object with a third reference beam on a second holographic plate for subsequent interpretation.

* * * * *